US010203723B2

(12) United States Patent
Serota

(10) Patent No.: US 10,203,723 B2
(45) Date of Patent: Feb. 12, 2019

(54) HEADSET WITH INTEGRATED COMPUTING SYSTEM

(71) Applicant: Virtual Goggles Inc., Oswego, IL (US)

(72) Inventor: Lee Serota, Oswego, IL (US)

(*) Notice: Subject to any disclaimer, the term of this patent is extended or adjusted under 35 U.S.C. 154(b) by 0 days.

(21) Appl. No.: 15/823,979

(22) Filed: Nov. 28, 2017

(65) Prior Publication Data

US 2018/0081394 A1    Mar. 22, 2018

Related U.S. Application Data

(63) Continuation-in-part of application No. 15/431,602, filed on Feb. 13, 2017, now Pat. No. 9,858,030, which is a continuation-in-part of application No. 14/480,384, filed as application No. PCT/US2013/025784 on Feb. 12, 2013, which is a
(Continued)

(51) Int. Cl.
| | |
|---|---|
| *G06F 1/16* | (2006.01) |
| *G06F 1/20* | (2006.01) |
| *A63F 13/24* | (2014.01) |
| *A63F 13/235* | (2014.01) |
| *A63F 13/54* | (2014.01) |
| *A63F 13/212* | (2014.01) |
| *A63F 13/98* | (2014.01) |
| *A63F 13/323* | (2014.01) |
| *A63F 13/338* | (2014.01) |
| *A63F 13/332* | (2014.01) |
| *A63F 13/327* | (2014.01) |

(52) U.S. Cl.
CPC ............ *G06F 1/163* (2013.01); *A63F 13/212* (2014.09); *A63F 13/235* (2014.09); *A63F 13/24* (2014.09); *A63F 13/323* (2014.09); *A63F 13/54* (2014.09); *A63F 13/98* (2014.09); *G06F 1/169* (2013.01); *G06F 1/1615* (2013.01); *G06F 1/1624* (2013.01); *G06F 1/1681* (2013.01); *G06F 1/1686* (2013.01); *G06F 1/1688* (2013.01); *G06F 1/1698* (2013.01); *G06F 1/203* (2013.01); *A63F 13/327* (2014.09); *A63F 13/332* (2014.09); *A63F 13/338* (2014.09)

(58) Field of Classification Search
CPC .................................................. G02B 27/0176
See application file for complete search history.

(56) References Cited

U.S. PATENT DOCUMENTS

| 2002/0190923 A1* | 12/2002 | Ronzani | G02B 27/017 345/50 |
| 2010/0245585 A1* | 9/2010 | Fisher | H04M 1/6066 348/164 |

(Continued)

*Primary Examiner* — Amare Mengistu
*Assistant Examiner* — Shawna Stepp Jones

(57) ABSTRACT

A headset with an integrated computing system is an all in one device that includes an adjustable support band, a first and second ear cover, a computer system, a communications system, and a power source. The adjustable support band connects to each ear cover, with the ear covers being adjacent to a user's ears. The computer system is capable of storing and running software programs and interfacing with connected devices by means of a set of connection ports or the communications system. Any plethora of auxiliary devices can be attached to the headset be fully functional due to the many connection ports.

11 Claims, 9 Drawing Sheets

Related U.S. Application Data continuation-in-part of application No. 13/603,216, filed on Sep. 4, 2012, now Pat. No. 8,577,427.

(60) Provisional application No. 61/608,307, filed on Mar. 8, 2012, provisional application No. 61/645,303, filed on May 10, 2012, provisional application No. 61/906,915, filed on Nov. 21, 2013, provisional application No. 62/520,208, filed on Jun. 15, 2017.

(56) References Cited

U.S. PATENT DOCUMENTS

| | | | |
|---|---|---|---|
| 2011/0267439 A1* | 11/2011 | Chen | G02B 27/2264 348/53 |
| 2011/0273365 A1* | 11/2011 | West | G02B 27/0176 345/8 |
| 2012/0235900 A1* | 9/2012 | Border | G02B 5/23 345/156 |

* cited by examiner

HEADSET WITH INTEGRATED COMPUTING SYSTEM

FIELD OF THE INVENTION

The present invention relates generally to a headset with multiple wearable settings, as well as upgrading capabilities.

BACKGROUND OF THE INVENTION

There are currently many devices, including headgear, head phones and ear buds, which allow users to listen to their devices. The devices currently on the market are narrow in focus, only allowing users to listen, speak, and adjust volume. None of the devices currently allow the user to fully integrate the device they are using into the headset. Not only that, but technology is ever improving, which results in some of these devices becoming quickly outdated.

It is therefore an object of the present invention to provide a computerized and upgradable headgear which allows users to process every aspect of a multitude of devices. The invention at hand allows users to attach a multitude of devices to their head set, charge said devices, and listen to them in a more comfortable and private fashion. The invention at hand even allows users to interact with the attached devices by using a built-in mouse pad, thus enhancing the user experience to a whole new level.

The present invention combines basic computer capabilities with an advanced display and multimedia environment. Numerous connection methods and tertiary features are included to ensure the present invention is a useful product regardless of the situation and location users may find themselves.

DETAIL DESCRIPTIONS OF THE INVENTION

Figure 1:
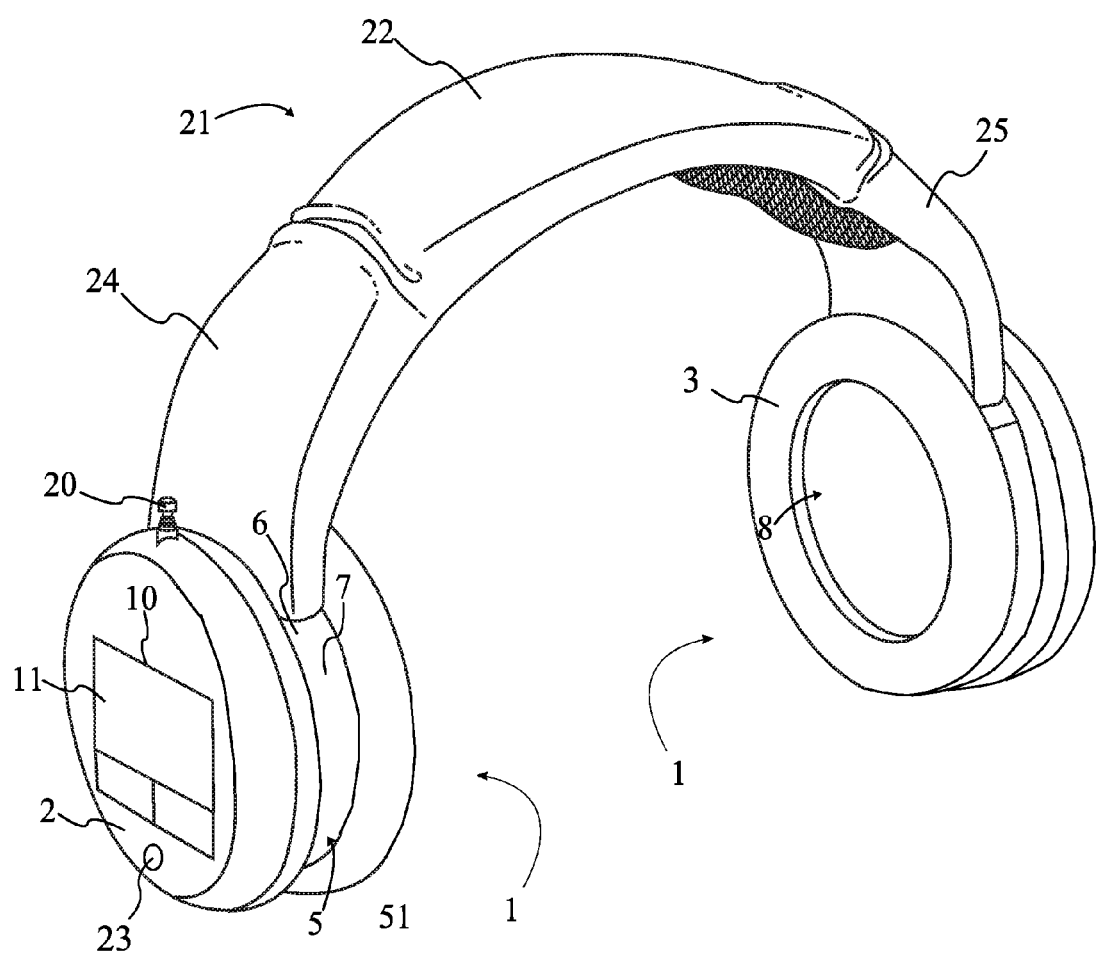
FIG. 1 is a perspective view of the present invention.

All illustrations of the drawings are for the purpose of describing selected versions of the present invention and are not intended to limit the scope of the present invention.

The present invention is a headset with three adjustable positions for comfort which comprises a built-in computer system 38 and a component storage section. Referring to FIGS. 1-8, The present invention comprises a pair of ear covers 1, an expandable support band 21, a computer system 38, a communications system 42, and a power source 50. The expandable support band 21 connects the first ear cover 2 and the second ear cover 3, allowing the expandable support band 21 to rest atop a user's head while the first ear cover 2 and second ear cover 3 rest against a user's ears. The computer system 38, communications system 42, and power source 50 are all contained with the present invention, with individual subcomponents housed within the first ear cover 2, the second ear cover 3, or the expandable support band 21. The power source 50 provides sufficient power to run the computer system 38 and communications system 42, as well as any auxiliary devices included or optional attachable accessories. The computer system 38 is electronically connected to the communications system 42 and any auxiliary components, allowing the computer system 38 to process any relevant information. The present invention and its constituent components are illustrated via FIG. 1-FIG. 6. FIG. 4 illustrates the rotatable aspect of the expandable support band into three different positions. Electronic and electrical aspects are outlined in FIG. 7-FIG. 9.

The pair of ear covers 1 comprises a first ear cover 2 and a second ear cover 3. The first ear cover 2 and second ear cover 3 each comprise an enclosure 4, an annular rail 5, a speaker 8, a control interface 9, a set of connection ports 12, and an antenna 20. The enclosure 4 preferably has a cylindrical shape, being wide enough to cover an ear. The speaker 8 is located on an interior face of the enclosure 4, where it would be adjacent to a user's ear while the present invention is being worn. The speakers 8 also include a padding around the perimeter of the speaker 8 to cushion a user's ear against the ear covers and to increase user comfort. On an exterior face, opposite the speaker 8, is where the control interface 9 is positioned. The control interface 9 allows a user to interact with the present invention while wearing it, simply by using a free hand to send commands through the control interface 9. The control interface 9 comprises an input housing 10 and an input device 11. The input housing 10 is recessed into the enclosure 4 and holds the input device 11. The input device 11 is preferably a touchpad with mouse buttons, similar to that integrated into laptop computers. In other words, the input device 11 may be a built-in mouse pad. However, the input device 11 may vary in other embodiments.

In addition, it is preferable that the input device 11 can be removed from the input housing 10 and used remotely, sending commands to the computer system 38 by means of the communications system 42. The annular rail 5 is concentrically positioned with the enclosure 4 on the annular lateral face of the enclosure 4 and comprises a track 6 and guide slider 7. The guide slider 7 is restrained to the track 6, but is free to move along the track 6. The guide slider 7 (of the first ear cover 2 and the second ear cover 3) serves as a connection point for any front mounted auxiliary equipment the user wishes to mount, allowing the angle between the expandable support band 21 and the mounted auxiliary device to be adjusted. This allows a user to rotate the auxiliary equipment such that the expandable support band 21 is either above or behind a user's head. The antenna 20 is rotatably connected to the enclosure 4, allowing it to be adjusted to provide better reception as necessary. Preferably, the antenna 20 is also telescoping, such that it may be extended to improve reception or retracted to increase the visual appeal of the current invention. Furthermore, a power button 23 may be positioned on the enclosure of the first ear cover 2 adjacent to the input housing 10, and the power button 23 may be electronically connected to the computer system 38. In other embodiments, the power button 23 may be positioned on the second ear cover 3, on the expandable support band 21, or in any other desirable location.

Figure 2:
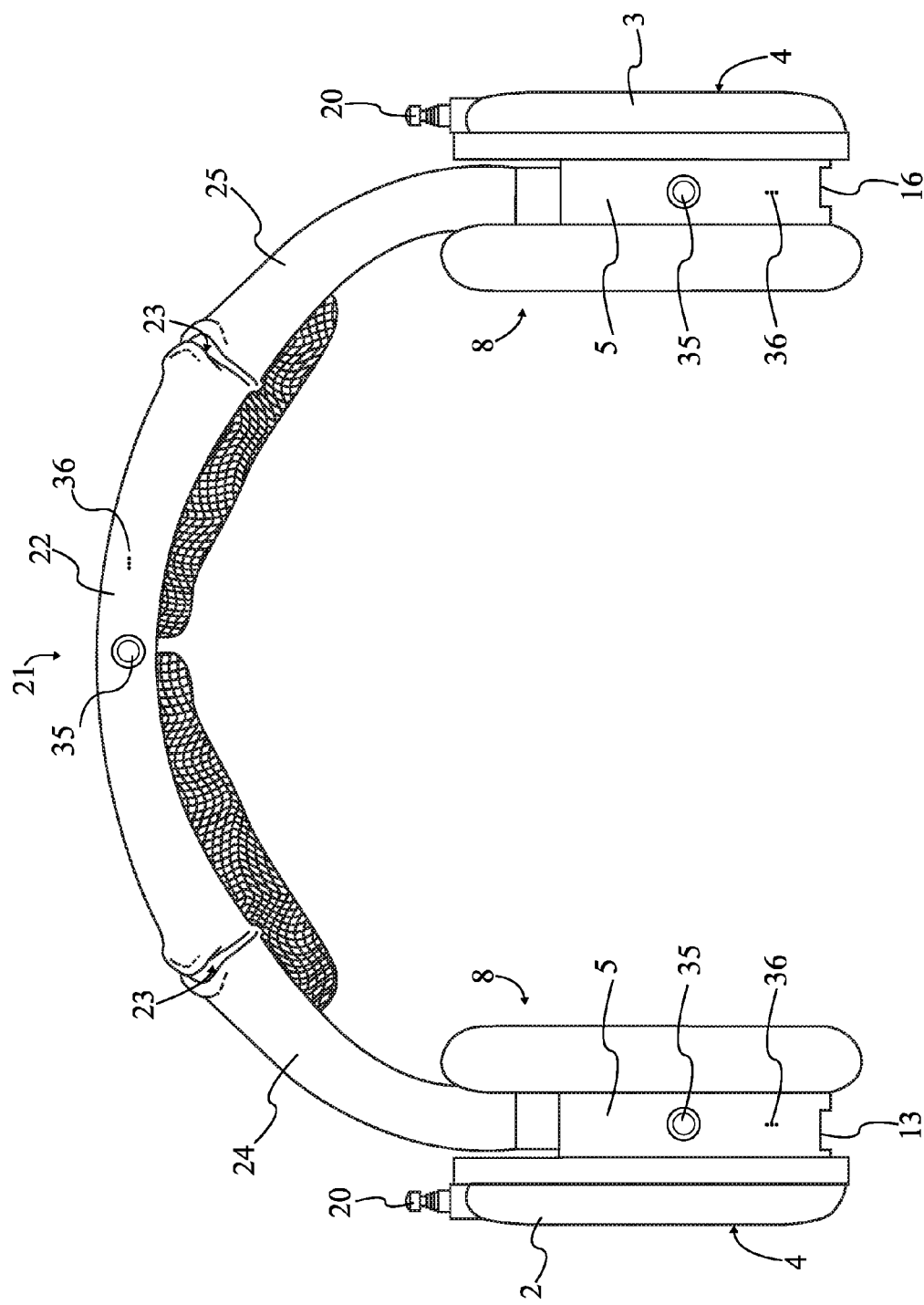
FIG. 2 is a front view of the perspective invention.

In one embodiment, either the expandable support band 21, the first ear cover 2, the second ear cover 3, or any combination thereof, may further comprise a webcam 35 and/or a microphone 36, as shown in FIG. 2. In any embodiment, the webcam 35 and microphone 36 should be positioned to face a forward direction while the user is wearing the present invention. For example, the webcam 35 and/or the microphone 36 may be positioned on the annular screen rail 5 opposite the set of connection ports 12. In another embodiment, the webcam 35 and/or microphone 36 may be positioned on the main section 22 of the expandable support band 21. Similarly, in some embodiments the present invention may comprise additional features, such as, but not limited to, a flashlight, one or more LED lights, an auxiliary speaker, a digital display screen, and the like.

In one embodiment, the first ear cover and the second ear cover each comprise an angular locking mechanism 60, illustrated in FIG. 4. Through the angular locking mechanism 60, the guide slider 7 is selectively rotationally fixed with respect to the track 6 by the angular locking mechanism 60, and therefore the expandable support band 21 may be selectively fixed into a variety of orientations with respect to the front mounted auxiliary equipment. For example, the expandable support band 21 may be selectively engaged into at least but not limited to three different positions. The expandable support band 21 can be engaged into orientations such as, but not limited to, a 90 degree vertical orientation, a 135 degree back of the head orientation, or a 180 degree behind the neck orientation by the angular locking mechanism 60, as illustrated in FIG. 4. The previously stated degree orientations may be understood to be in reference to a horizontal, forward direction, such as when a user is looking straight in front of themselves. In other embodiments, the expandable support band 21 may be capable of being locked into a variety of other positions relative to the user's head.

The specific mechanical means through which the angular locking mechanism 60 functions is not of particular material importance to the present invention, so long as the aforementioned capability of the user to choose a desired angle between the expandable support band 21 and the front mounted auxiliary equipment. It is contemplated, however, that in one embodiment, the angular locking mechanism 60 comprises a primary engagement point 61 and a plurality of secondary engagement points 62. The primary engagement point 61 is positioned on the guide slider 7, and the plurality of secondary engagement points 62 are angularly distributed along the track 6. Thus, the primary engagement point 61 of the guide slider 7 can be selectively engaged with one of the plurality of secondary engagement points 62. The specific nature of the engagement points is not of particular concern. For example, in one embodiment, the primary engagement point 61 is a pin, while the secondary engagement points 62 are holes into which the pin can be inserted. In another embodiment, the primary engagement point 61 is a nub, while the secondary engagement points 62 are recesses into which the nub which falls and sufficient force must subsequently be applied in order to urge the nub out of the recess. This arrangement is shown in FIG. 4 as dashed lines interior to the second ear cover 3. Similarly but in juxtaposition, in another embodiment the primary engagement point 61 is a recess, while the secondary engagement points 62 are nubs. In one embodiment, the angular locking mechanism 60 does not comprise any discrete engagement points and the guide slider 7 may be fixed in place relative to the track 6 through other means, such as, but not limited to, a tightening mechanism which fixes the guide slider 7 in place through friction.

As discussed, the present invention further comprises one or more storage compartments. Within the storage compartments, the user may hold a multitude of items and components which can be further incorporated into the design. Items such as a stylus, keys, wires, microchips, Bluetooth devices, etc. may be housed within the storage unit. In the preferred embodiment of the invention, the storage compartments are housed within either the first ear 2 cover, the second ear cover 3, or the first and second ear cover. In other embodiments of the invention, the storage compartment is housed within the main section 22, first end section 24, second end section 25, or any other combination of these sections of the expandable support band 21. The storage compartment may further comprise a lid. The method of attachment of the lid may be, but is not limited to, twisting to lock, a hinge, or a press fit to pop the lid on or off. When closed, the lid creates an air tight seal with the storage compartment as to protect any components stored within the storage compartment.

Furthermore, the present invention may further comprise an interior cavity. Similar to the storage compartments, the interior cavity may be positioned within the first ear cover 2, the second ear cover 3, or one of the sections of the expandable support band 21. The interior cavity may differ from the storage compartments in that any additional electronic components may be installed within the interior cavity in order to expand the functionalities of the present invention. In one embodiment, the interior cavity may comprise one or more types of electrical connection necessary for installing additional electronic components for advanced wireless multifunctionality.

Figure 3:
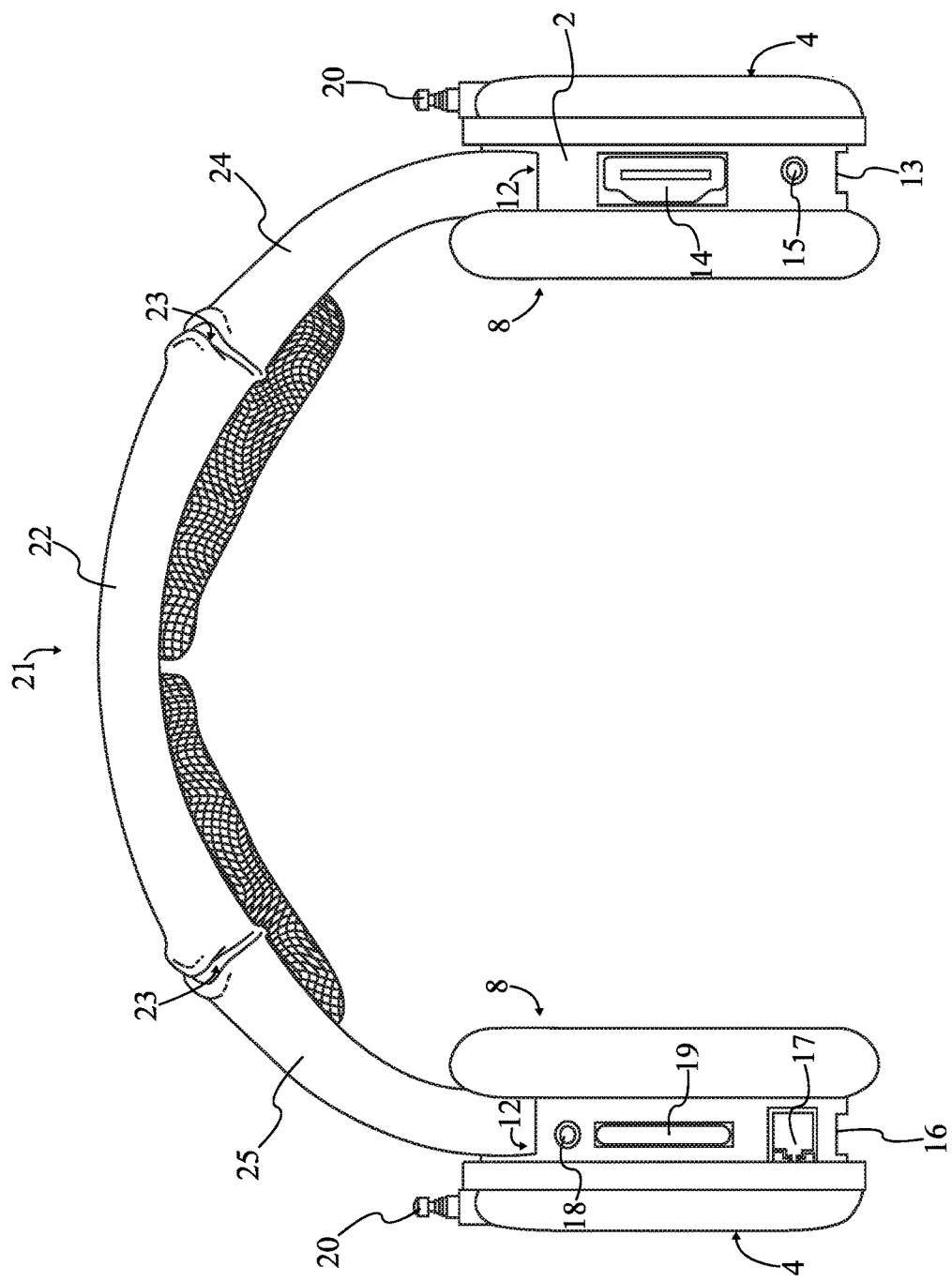
FIG. 3 is a rear view of the present invention.
Figure 4:
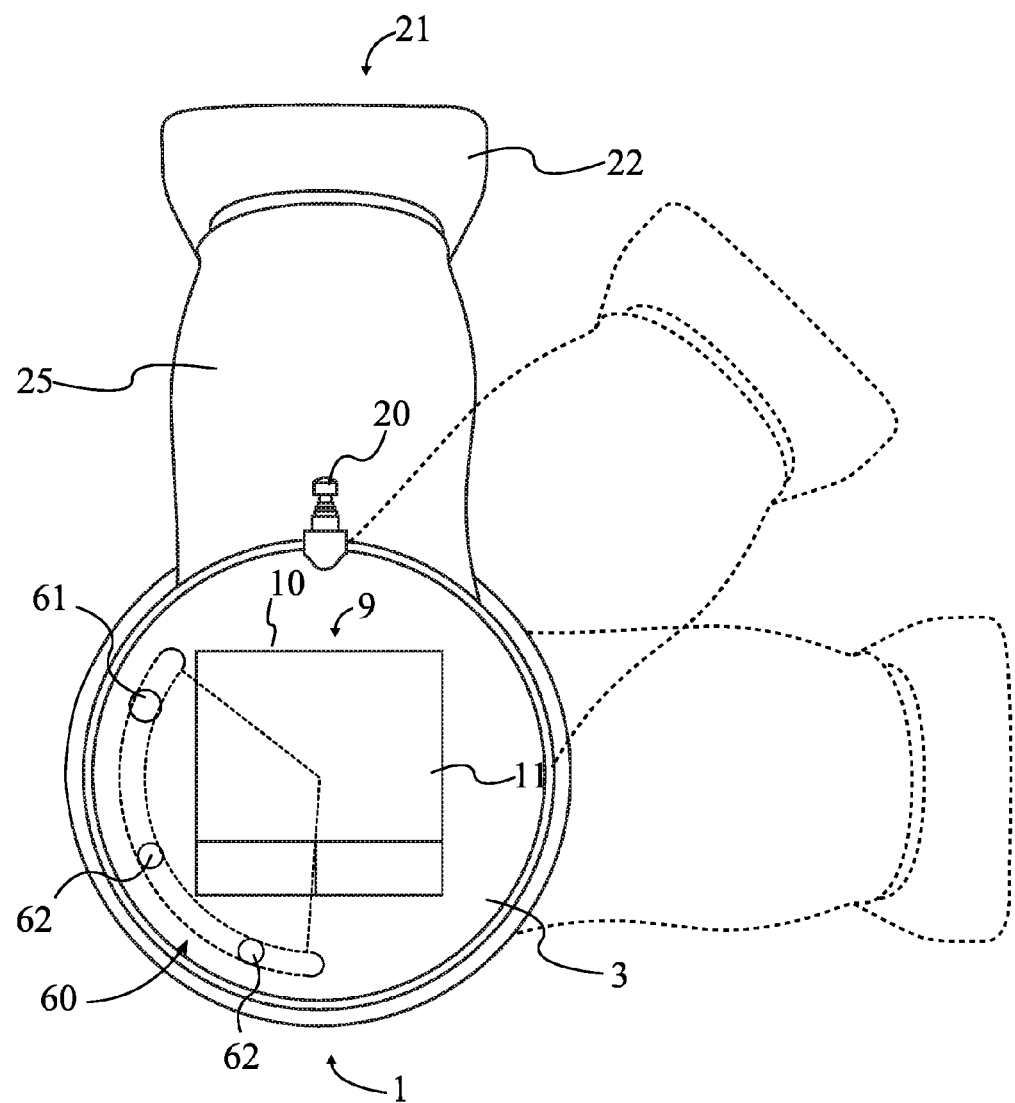
FIG. 4 is a right view of the present invention illustrating different orientations of the expandable support band in relation to the ear covers.
Figure 5:
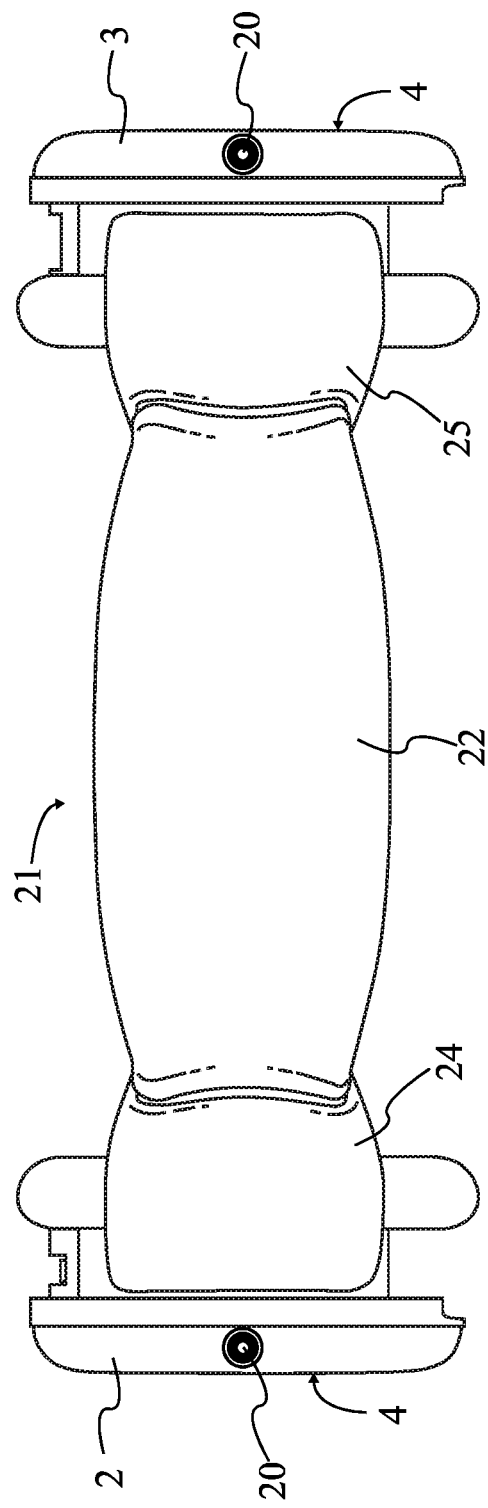
FIG. 5 is a top view of the present invention.
Figure 6:
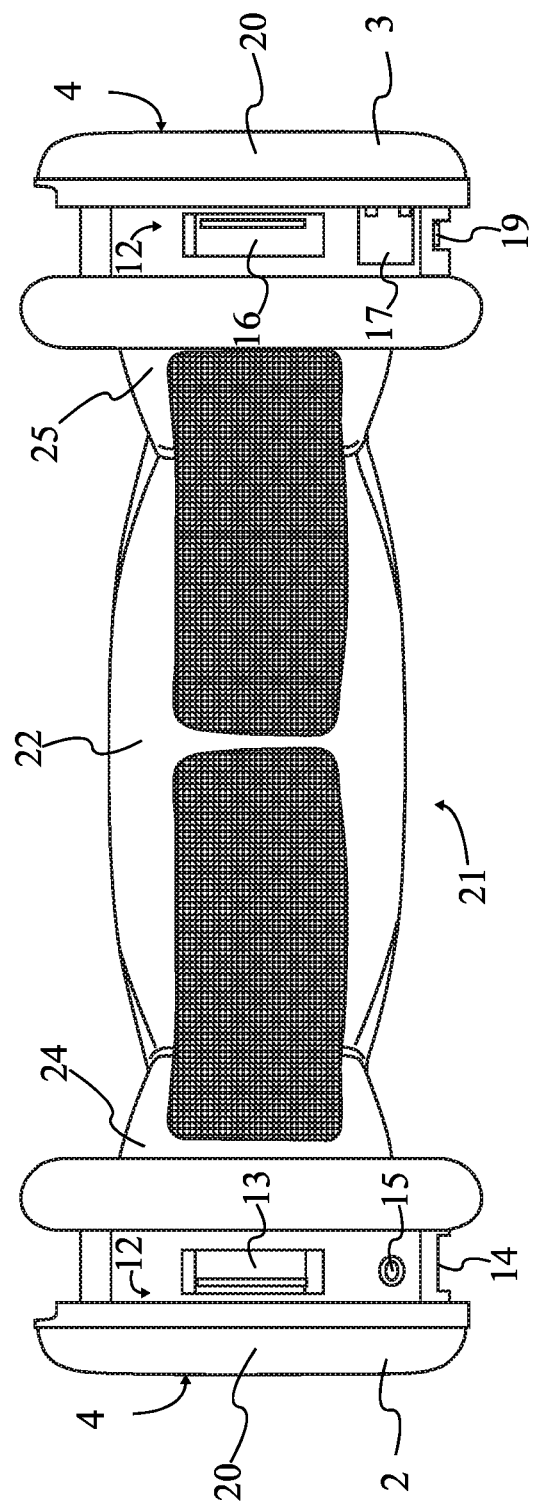
FIG. 6 is a bottom view of the present invention.

Referring to FIG. 3 and FIG. 6, in some embodiments, the set of connection ports 12 on the first ear cover 2 may comprise a first Universal Serial Bus (USB) input 13, a High-Definition Multimedia Interface (HDMI) input 14, and an audio input 15. The set of connection ports 12 on the second ear cover 3 may further comprise a second USB input 16, an Ethernet input 17, a power port 18, and a Secure Digital (SD) card slot 19. Each set of connection ports 12 is powered by the power source 50 and in communication with the computer system 38, allowing the present invention to make use of external accessories like flash drives, printers, external displays such as monitors, and the like. The antenna 20 of the first ear cover 2 is preferably a television antenna 20, allowing the present invention to receive television broadcasts, while the antenna 20 of the second ear cover 3 is preferably a satellite antenna 20 allowing the present invention to receive satellite signals. It should be understood however that any useful type of antenna may be utilized. The enclosures 4 are protected by a waterproof coating, such as polyurea, to help prevent water from leaking into and damaging the electronic components.

In other embodiments, the annular rail 5 could instead be connected to the expandable support band 21, resulting in the front mounted auxiliary equipment connection being fixed while the expandable support band 21 can be rotated around the pair of ear covers 1. It is also possible for the speakers 8 to be positioned away from a user's ears, rather than adjacent to said ears. However, this would likely decrease user comfort and also allow other persons in proximity to hear sound from the speakers 8, reducing privacy of the user. Other possible alterations include allowing the first ear cover 2 and second ear cover 3 to rotate at the location where the first ear cover 2 and second ear cover 3 connect to the expandable support band 21. This would allow the first ear cover 2 and second ear cover 3 to rotate until they are flat, such that the speaker 8 could rest on a flat surface like a table. This would allow the ear covers to serve as stands for the present invention, letting a user interact with the present invention even while not wearing it.

The expandable support band 21 is worn on the head, supporting the present invention on a user's head as well as securing the first ear cover 2 to the second ear cover 3. The expandable support band 21 preferably comprises a main section 22, a first end section 24, and a second end section 25. The main section 22 comprises a main rail 23, which is internal to the main section 22. The main rail 23 runs the length of the main section 22, protruding from a first end and second end of the main section 22. The main rail 23 inserts to the first end section 24 and second end section 25, connecting the first end section 24 to the first end of the main section 22. Similarly, the main rail 23 connects the second end section 25 to the second end of the main section 22. In this manner the first end section 24 and second end section 25 may be moved closer to or away from the main section 22, simply by sliding along the main rail 23. This allows a user to alter the length of the expandable support band 21 to better support their individual head size. The expandable support band 21 also helps to secure the other components of the present invention; the first ear cover 2 is attached to the first end section 24 opposite the main section 22 just as the second ear cover 3 is attached to the second end section 25 opposite the main section 22. The main section 22, first end section 24, and second end section 25 each include padding on a bottom surface. The padding serves as a soft layer between the expandable support band 21 and a user's head, increasing user comfort. The main section 22, first end section 24, and second end section 25 each also include a waterproof coating over an exterior upper surface. This waterproof coating can be made from a variety of materials, such as polyurea, and serves to repel water and help protect internal components, especially electrical components, from water damage. As discussed, this configuration of the expandable support band 21 allows a user to expand or contract portions of the present invention; in this manner the present invention is able to accommodate individual variations in head shape and width.

In other embodiments the expandable support band 21 may use an adjustment method other than the main rail 23 system. For example, the first end section 24 and second end section 25 could be connected to the main section 22 by a compressible material, similar to the bellows of an accordion. Another possible addition is the inclusion of intermediate sections. These intermediate sections could provide finer adjustments to the curve of the expandable support band 21. The first end section 24 and second end section 25 could also be rotatably attached to the first ear cover 2 and second ear cover 3, respectively, allowing the expandable support band 21 to rotate just as the screen is capable of rotating.

In one embodiment, the front mounted auxiliary equipment may further comprise a cooling system 52. The purpose of the cooling system 52 is to keep the face of the user cool while wearing the present invention for maximum comfort during extended use. In various embodiments, the cooling system 52 may comprise various quantities of fans. More particularly, in one embodiment the cooling system 52 comprises a first fan 53 and a second fan 54. In various other embodiments, however, the first fan 53 and the second fan 54 may be positioned on the expandable support band 21, the first ear cover 2, or the second ear cover 3. The cooling system 52 is electrically connected to the power source 50 in order to operate the first fan 53 and the second fan 54. In one embodiment, the cooling system 52 further comprises a switch 55. The switch 55 is electrically coupled between the cooling system 52 and the power source such that the switch 55 controls flow of electricity from the power source 50 to the first fan 53 and the second fan 54. The switch 55 may be located in any desired position on the display system 31, the expandable support band 21, or the first ear cover 2 or the second ear cover 3. In one embodiment, the cooling system 52 is electronically connected to the computer system 38, so that the computer system 38 controls flow of electricity from the power source 50 to the first fan 53 and the second fan 54. Thus, the user may utilize the input device 11 of the control interface 9 to activate and deactivate the cooling system 52, or the computer system 38 may be programmed to automatically control activation of the cooling system 52.

Figure 7:
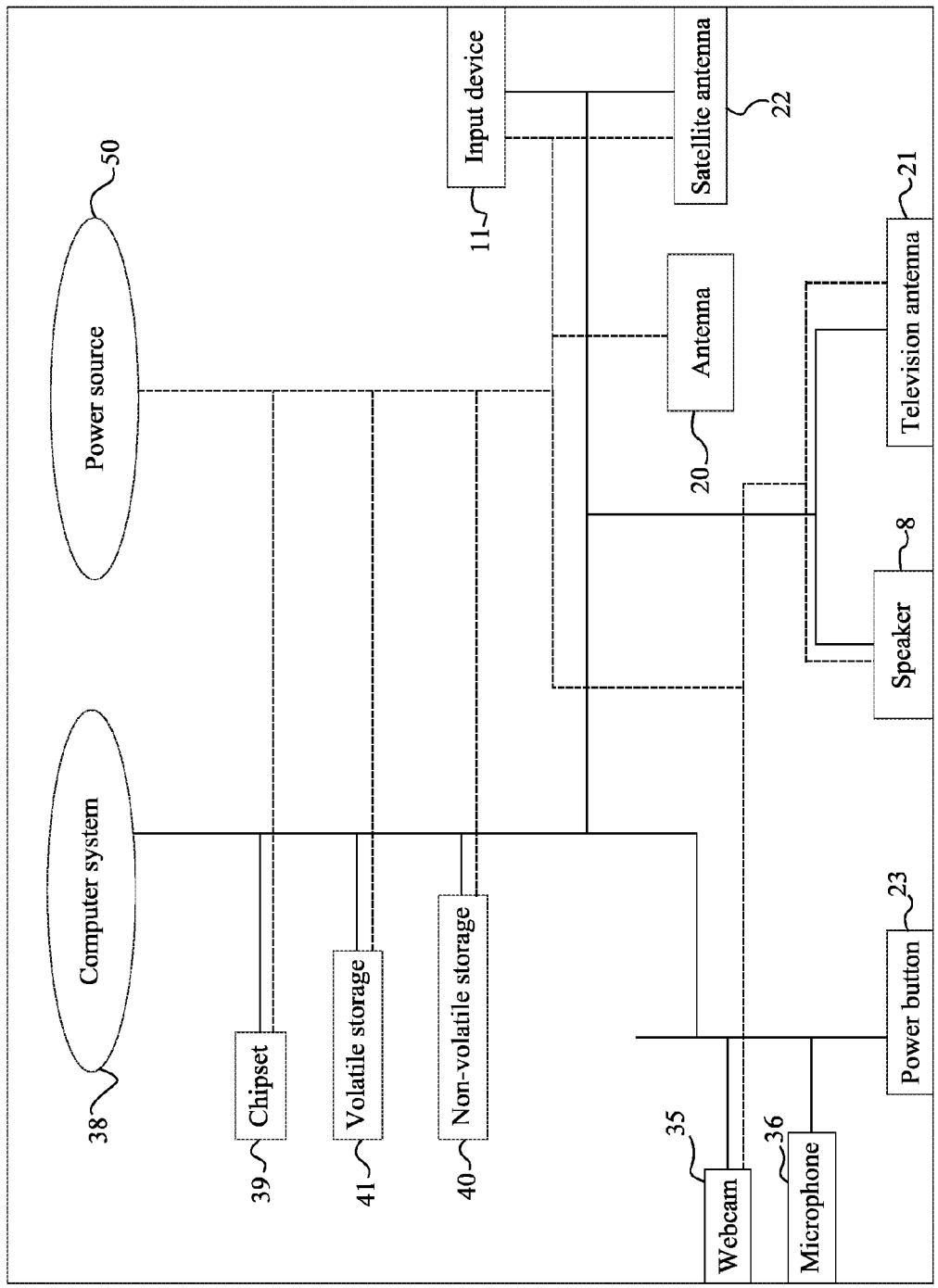
FIG. 7 is a graphic showing electrical and electronic connections of the present invention.

Referring to FIG. 7, preferably, the computer system 38 comprises a chipset 39, a non-volatile storage 40, and a volatile storage 41. The chipset 39 can run instructions, allowing the present invention to utilize software and operating systems. The non-volatile storage 40 allows the present invention to install an operating system and software programs. The volatile storage 41 allows the present invention to use programs at faster speeds. In the preferred embodiment, the non-volatile storage 40 will utilize NAND flash while the volatile storage 41 will use random access memory, preferably DDR3 SDRAM. In combination, these three components allow the present invention to effectively run an operating system (such as Android™) and other programs. The computer system 38 is in communication with all other electronic devices of the system, including the communications system 42, set of inputs, front mounted auxiliary equipment, connection ports 12, and antenna 20. This allows the computer system 38 to interact with all other components as well as output information. The computer system 38 is preferably housed with either the first ear cover 2 or the second ear cover 3, although it could also be split across both if desired.

In other embodiments the computer system 38 could include additional specialized components. For example, the computer system 38 could include a dedicated graphics or sound module, to provide better quality video and audio to users, if the video content is provided by auxiliary equipment. However, such additions come at the price of increased power usage and may not provide a significant enough increase in performance to justify the higher power requirements. Ideally, the preferred computer system 38 will be capable of performing basic tasks such as video playback and word processing.

Figure 8:
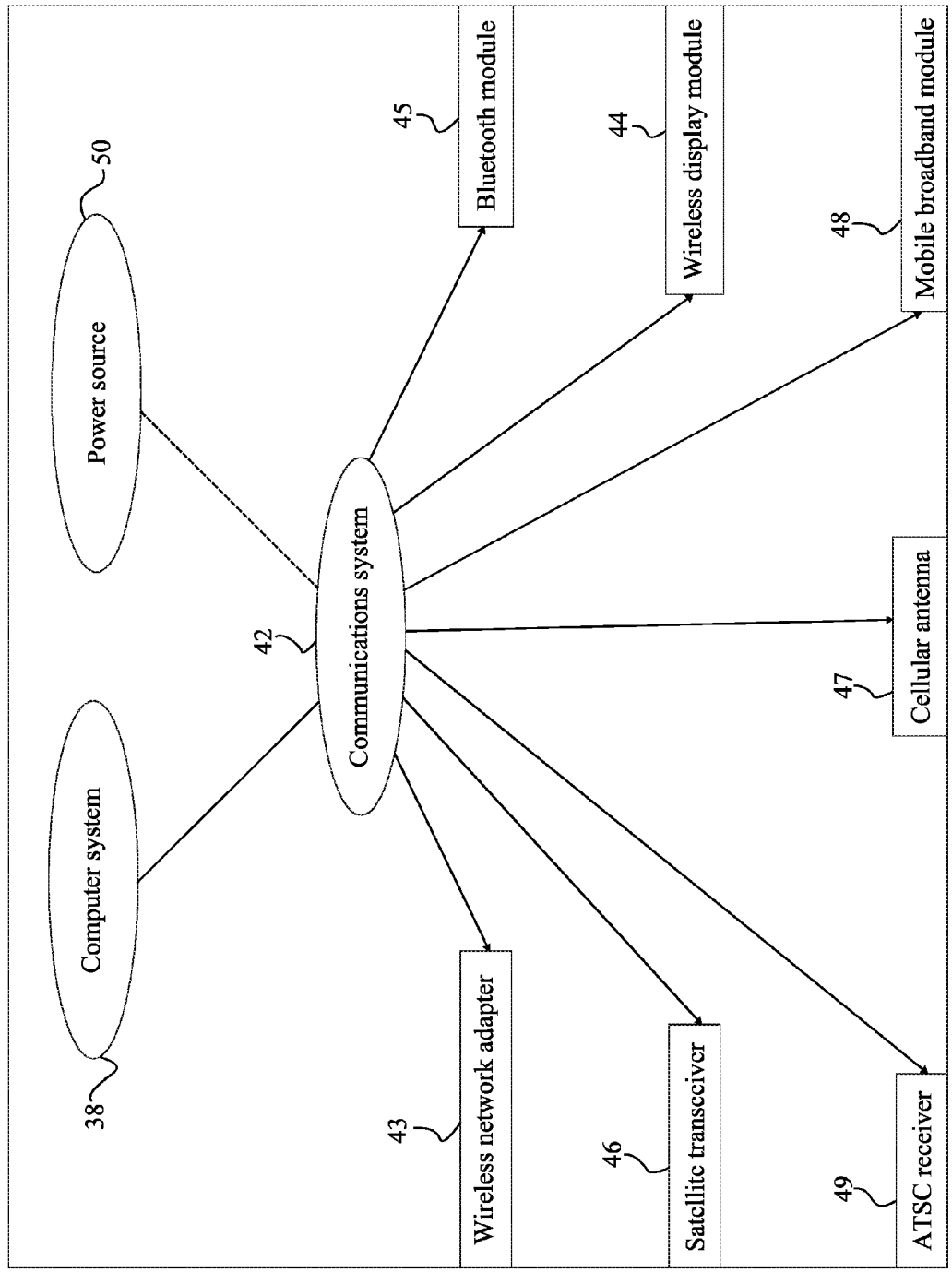
FIG. 8 is another graphic showing electrical and electronic connections of the present invention.
Figure 9:
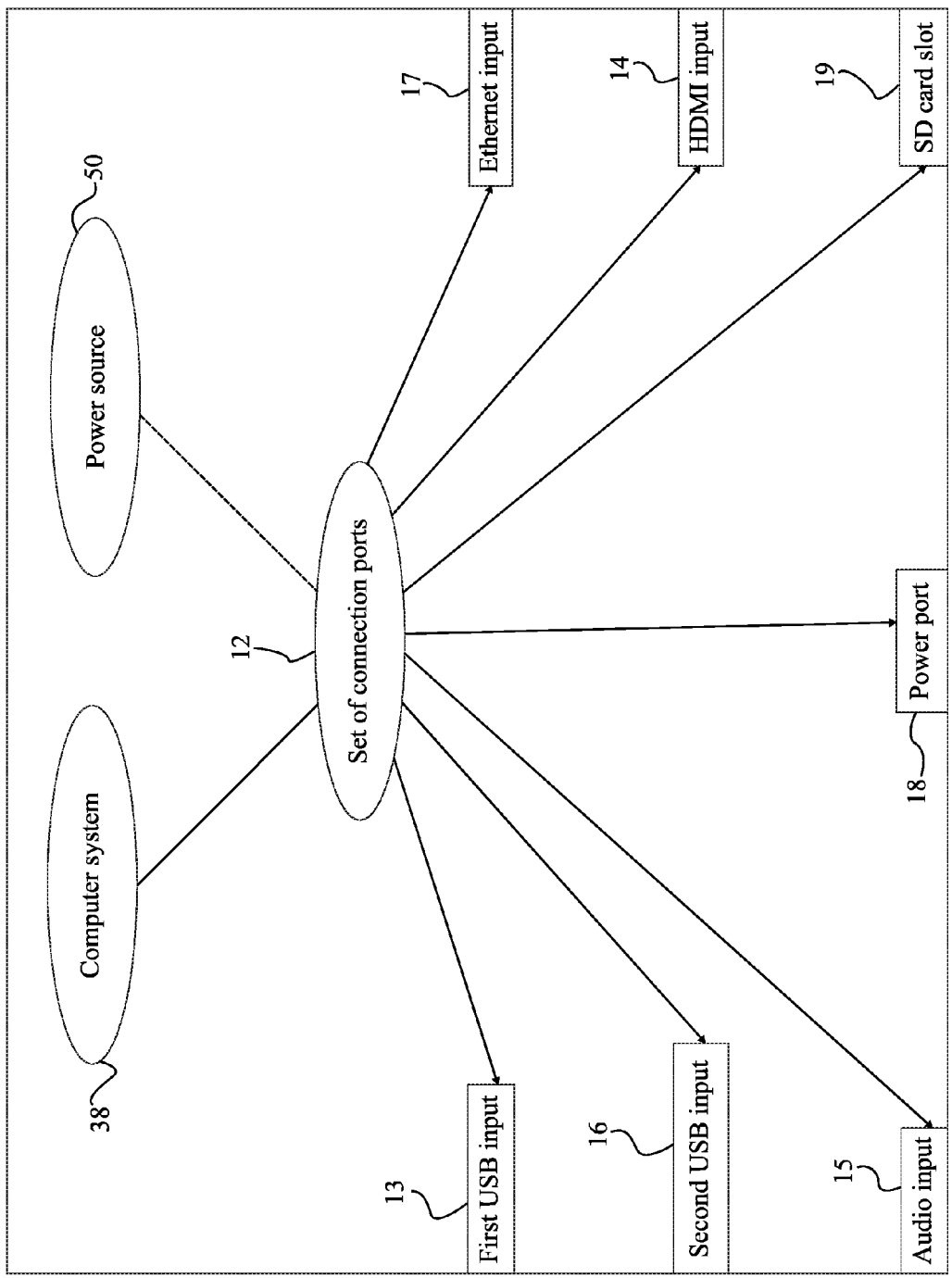
FIG. 9 is another graphic showing electrical and electronic connections of the present invention.

Referring to FIG. 8, in various embodiments the communications system 42 may comprise a wireless network adapter 43, a wireless display module 44, a Bluetooth module 45, a satellite transceiver 46, a cellular antenna 47, a mobile broadband module 48, and an Advanced Television Systems Committee (ATSC) receiver 49. The ATSC receiver 49 communicates with the television antenna 20 of the first ear cover 2, allowing the present invention to play certain television broadcasts picked up by the television antenna 20. Likewise, the satellite transceiver 46 communicates with the satellite antenna 20 of the second ear cover 3, allowing the present invention to send and receive information over satellite networks, enabling the use of features such as GPS. The wireless network adapter 43 allows the present invention to connect to nearby networks (generally 802.11, as well as devices connected to those networks), while the Bluetooth module 45 allows other Bluetooth enabled devices, such as some console controllers, remotes, and smart phones, to interface with the present invention. The wireless display module 44 allows the present invention to output information to a compatible external display, such as a television; this feature can be replicated using the HDMI connection if a compatible external display is not available.

The cellular antenna 47 allows the present invention to operate over cell networks, while the embedded mobile broadband module 48 allows the present invention to utilize the broadband internet access provided by cellular companies, such as 3G. The mobile broadband module 48 provides a larger area of network coverage, useful if there are no proximal wireless networks. As with the computer system 38, the communications system 42 can be housed with the first ear cover 2, the second ear cover 3, or split between both. Ideally the ATSC receiver 49 will be positioned adjacent to the television antenna 20, house within the first ear cover 2. Likewise, the satellite transceiver 46 will be housed within the second ear cover 3, adjacent to the satellite antenna 20.

In other embodiments, a variety of accessory devices could enhance the functionality of the present invention. One potential accessory device is a controller that can be communicably coupled to the pair of communications system 42 and/or the computer system 38, making games and other programs easier to use with the present invention. Potentially, a laser keyboard could be positioned on the exterior side of the display system 31 or on the first screen bar 26 or second screen bar 27. The laser keyboard would create a virtual keyboard on a flat surface, allowing a user to type with the present invention without the need to carry around a keyboard. In another embodiment of the device, the front mounted auxiliary equipment could be smart phone, which would allow the user to use the cellphone hands free, while having it charge from the headset and listen to sound from the headset instead of the phone. Another potential accessory device would be a flashlight. The flashlight would be attached to the pair of ear covers 1 and would allow a user to better see their surroundings when using the present invention in low light conditions, such as during a nighttime stroll. A camera system comprises a front exterior camera and a rear exterior camera. The front exterior cameras would face away from the present invention, in a forward or backwards direction. The exterior cameras would store information on the computer system 38, then allow a user to play back video footage from their front and backsides, outputting footage to an external display. The exterior cameras could also be given low-light or thermal viewing capabilities, allowing the cameras to be used in a wider variety of situations. As well as providing video capabilities, the exterior cameras would function as regular cameras, being capable of taking pictures. Another possible addition is a security device located on the first and second ear covers to limit access to the present invention. The security device could be a thumbprint reader or utilize a more intricate method. Other possible inclusions include power indicators and temperature sensors. In general a wide variety of accessory devices can be added to enhance the utility of the present invention without interfering with the intended function. In the future the present invention will also be able to make use of new standards and technologies as they develop. For example, cell phone communications standards have evolved from 3G, to 4G, and eventually new standards such as 5G will be introduced. Visual and audio technologies are also advancing, with the concept of 5D recently having been introduced. As these and other new technologies develop, the present invention will be able to incorporate them as well as the necessary components.

Although the invention has been explained in relation to its preferred embodiment, it is to be understood that many other possible modifications and variations can be made without departing from the spirit and scope of the invention as hereinafter claimed.

What is claimed is:

1. A headset with integrated computing system comprising:
   a pair of ear covers;
   the pair of ear covers comprising a first ear cover and a second ear cover;
   an expandable support band;
   a computer system;
   the computer system running an operating system;
   a communications system;
   a power source;
   the first ear cover and second ear cover each comprising an enclosure, an annular rail and an angular locking mechanism;
   the annular rail being concentrically positioned with the enclosure;
   the annular rail comprising a track and a guide slider;
   the guide slider being selectively rotationally fixed with respect to the track by the angular locking mechanism;
   the expandable support band being connected to the guide slider of the first ear cover and the guide slider of the second ear cover;
   the power source being electrically connected to the computer system and the communications system; and
   the computer system being electronically connected to the communications system and the display system.

2. The headset with integrated computing system as claimed in claim 1 comprising:
   the first ear cover and the second ear cover each comprising a speaker, a control interface and a set of connection ports;
   the speaker being positioned on the enclosure opposite the control interface;
   the annular rail being positioned on the enclosure between the speaker and the control interface; and
   the set of connection ports being positioned on the enclosure adjacent to the annular rail around the enclosure.

3. The headset with integrated computing system as claimed in claim 2 comprising:
   the set of connection ports being electrically connected to the power source; and
   the set of connection ports being electronically connected to the computer system.

4. The headset with integrated computing system as claimed in claim 2 comprising:
   the set of connection ports of the first ear cover comprising a first Universal Serial Bus (USB) input, a High-Definition Multimedia Interface (HDMI) input and an audio input; and
   the set of connection ports of the second ear cover comprising a second USB input, an Ethernet input, a power port, and a Secure Digital (SD) card slot.

5. The headset with integrated computing system as claimed in claim 1 comprising:
   the angular locking mechanism comprising a primary engagement point and a plurality of secondary engagement points;
   the primary engagement point being positioned on the guide slider;
   the plurality of secondary engagement points being angularly distributed along the track; and
   the primary engagement point of the guide slider being capable of being selectively engaged with one of the plurality of secondary engagement points.

6. The headset with integrated computing system as claimed in claim 1, wherein the expandable support band is capable of being selectively engaged into either a 90 degree orientation, a 135 degree orientation, or a 180 degree orientation with respect to the display system through the angular locking mechanism.

7. The headset with integrated computing system as claimed in claim 1 comprising:
the first ear cover and second ear cover each comprising an antenna and a control interface;
the control interface comprising an input housing and an input device;
the antenna being rotatably connected to the enclosure adjacent to the annular rail;
the antenna traversing into the enclosure;
the input housing being recessed into the enclosure;
the input device being positioned in and attached to the input housing;
the speaker, the antenna and the input device each being electrically connected to the power source; and
the speaker, the antenna and the input device each being electronically connected to the computer system.

8. The headset with integrated computing system as claimed in claim 7 comprising:
a power button being positioned on the enclosure of the first ear cover adjacent to the input housing; and
the power button being electronically connected to the computer system.

9. The headset with integrated computing system as claimed in claim 1 comprising:
the expandable support band comprising a main section, a first end section and, a second end section;
the main section comprising a main rail;
the main rail laterally traversing through the main section;
the first end section being connected to the main section by the main rail;
the second end section being connected to the main section by the main rail opposite the first end section;
the first end section and the second end section each being slidably engaged with the main rail;
the first end of the expandable support band being connected to the first ear cover; and
the second end of the expandable support band being connected to the second ear cover.

10. The headset with integrated computing system as claimed in claim 1 comprising:
the computer system comprising a chipset, a non-volatile storage and a volatile storage;
the operating system being stored on the non-volatile storage; and
the computer system being housed within the pair of ear covers.

11. The headset with integrated computing system as claimed in claim 1 comprising:
the communications system comprising a wireless network adapter, a wireless display module, a Bluetooth module, a satellite transceiver, a cellular antenna, a mobile broadband module and an Advanced Television Systems Committee (ATSC) receiver;
the communications system being housed within the pair of ear covers;
the ATSC receiver being electronically connected to an antenna of the first ear cover; and
the satellite transceiver being electronically connected to an antenna of the second ear cover.

* * * * *